3,424,720
POLYBENZOTHIAZOLES
Bernard Rudner and Philip E. Brumfield, Pittsburgh, Pa., assignors to Koppers Company, Inc., a corporation of Delaware
No Drawing. Filed Apr. 18, 1963, Ser. No. 273,842
U.S. Cl. 260—47                    8 Claims
Int. Cl. C08g 32/02

This invention relates to the preparation of heat-resistant polymers containing benzothiazole nuclei. In one specific aspect, it relates to novel polybenzothiazoles made by the reaction of a dicarboxylic acid with a bis-(o-mercaptoarylamine).

The recent emphasis on space exploration has created a need for materials having greater thermal and oxidative stability. There has been a continued search for new heat-stable polymers suitable as construction materials for rocket nose cones and various other parts of space craft.

We have discovered polymers having unexpectedly high oxidative and thermal stability, made by the reaction of a dicarboxylic acid and a bis-(o-mercaptoarylamine). Our polymers, which are characterized by repeating substituted benzothiazole units, are useful in various commercial and military applications wherein thermal stability and shock resistance are particular requirements. The specific end use of our new polymers is determined to a certain extent by the nature of the dicarboxylic acid used in their preparation. Depending on the dicarboxylic acid, the properties of polymer tractability and flexibility can be controlled to suit the desired use. Controlled variation of polymer properties is a distinct advantage, since, in the various areas of utility for thermally stable polymers, e.g. as laminates, structural materials, adhesives and ablative materials, the needs vary considerably. The conjugated polymers of the invention made from an unsaturated dicarboxylic acid, such as maleic acid, are useful in semi-conductors.

There are few heretofore-known polybenzothiazoles. Polymers containing benzothiazole units are described in Morton et al., U.S. 3,047,543. The polymers of Morton are useful in adhesive components and must be made from a critical mixture of monomeric isomers in order to obtain a suitable reaction product of the desired properties. We have not experienced these limitations in the preparation of our new polymeric materials. Certain new polybenzothiazoles are made by the process described in the co-pending application of Philip E. Brumfield, Ser. No. 269,075, filed Mar. 29, 1963. The polymers of Brumfield, which have high oxidative and thermal stability are made by the reaction of sulfur and p-toluidine in mixed molten polysulfides. The polymers made according to the present invention possess, in some instances, even higher thermal stability than those made by the method of Brumfield. Furthermore, our novel polymers have a wider range of utility because of the possible modification of polymer properties that can be achieved by varying the dicarboxylic acid used during the polymer preparation.

It is, therefore, an object of the invention to provide novel polybenzothiazoles, characterized by unexpectedly high heat resistance, oxidative, ablative and hydrolytic stability. It is a further object to provide thermally-stable polymers useful in laminates, as structural materials, as adhesives, and in semi-conductors.

In accordance with the invention we have discovered polybenzothiazoles of the formula:

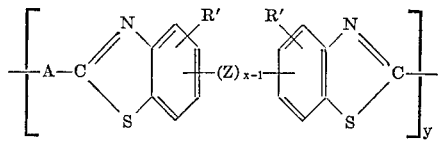

In the above formula R' is hydrogen or methyl. When x is one, the Z term is omitted, and when x is two, Z can be oxygen, sulfur or $SO_2$. A is $C_nH_{2n}$ or $C_nH_{2n-2}$ wherein n has a value of 2–10, $C_mF_{2m}$ wherein m has a value of 2–10, phenylene, tolylene, phenylenesulfonylphenylene, phenylenoxyphenylene, phenylenethiophenylene, xenylene, viz:

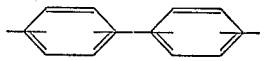

alkylene-bisphenylene wherein the alkylene portion has from 1–10 carbon atoms, viz:

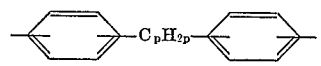

wherein p has a value of 1–10, naphthylene, pyridyl, or benezothiazoylphenylene. y has a value of at least two and can range up to 100,000. The foregoing arylene radicals include their obvious equivalents, such as the halo-, lower alkoxy-, or lower alkyl-substituted derivatives thereof.

The polymers of the invention are made by condensing a bis-(o-mercaptoarylamine) of the formula:

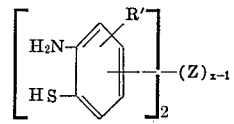

wherein R', Z and x are as defined aforesaid, with a dicarboxylic acid (or a derivative thereof) of the formula:

wherein A is defined aforesaid and X is OH or one of its functional equivalents, such as carboxylic acid esters, in which case X is OR, wherein R is phenyl, biphenyl, or lower alkyl, or acid halides, in which case x is Br, Cl or F. The X's collectively may represent the oxygen of the acid anhydride, which is the obvious functional equivalent of the acid, acid ester or acid halide.

Useful bis-(o-mercaptoarylamines) include 3,3'-dimercapto-benzidine, bis-(4-mercapto-3-aminophenyl)sulfone, bis-(3-mercapto-4-aminophenyl)ether, bis-(3-mercapto-4-aminotolyl)sulfone, bis-(3-mercapto-4-aminotolyl)ether, bis-(3-amino-4-mercaptophenyl)thio ether, and the like. Other compounds which function to make similar polymers include 2.7-diamino-3,6-dimercaptoanthraquinone, 2,2-bis-(7-amino-6-mercapto-2-naphthyl)propane, and 1,4-phenylene-bis(5-mercapto-6-amino-1-oxynaphthylene).

The dicarboxylic acids, or their functional equivalents useful in the invention include maleic anhydride, fumaroyl chloride, diphenyl pyridine dicarboxylate, perfluorosebacic acid dichloride, diphenic acid, isophthaloyl chloride, terephthaloyl chloride, di(biphenylyl) isophthalate, diphenyl oxy - bis - (4-benzoate), terephthalic acid, biphenylyl sebacate, poly-(cyclohexane-1,4-dicarboxylic anhydride), naphthalene-1,6-dicarboxylic acid, 2-phenylbenzothiazole-4',6-dicarboxylic acid chloride, sulfonylbis-(toluic)acid, and the like.

The degree of condensation of our novel polymers (represented by y in the above formula) is a function of the constituents used in the preparation of the polymer, the exact method of preparation, and the intended use. As indicated above, the value of y can vary from two up to about 100,000. The lower molecular weight products, e.g. y=2–10 in the structural formula, are useful as pre-polymers. Increasingly high molecular weight product, e.g. those having a value of y greater than 100, become increasingly insoluble and are therefore best made and used as compression moldings.

If the condensation is carried too far during the preparation of certain of the novel polymers, the resulting product is too infusible and insoluble and is difficult to mold. Such polymers are best made at lower stages of condensation and thereafter molded and heat cured at temperatures of about 400° C. to the high molecular weight infusible products.

The polymers of the invention can be prepared by (1) solution or suspension polymerization, (2) interfacial polymerization, and (3) melt polymerization. The method of preparation has a considerable influence on the molecular weight of the product. Interfacial polymerization gives polymers of the lowest molecular weight, i.e. those wherein $y$ of the formula ranges from 2–10,000. Solution or suspension polymerization can be conveniently controlled to provide polymers of a $y$ value of 500–50,000. Melt polymerization provides the highest molecular weight product, wherein the value of $y$ ranges from 1000 to 100,000.

Interfacial condensation is accomplished by using two immiscible solvents; one for the bis-(o-mercaptoarylamine) and the other for the dicarboxylic acid, which is preferably in the form of the acid halide. The bis-(o-mercaptoarylamine) is conveniently dissolved in aqueous base, such as sodium hydroxide or potassium hydroxide. The dicarboxylic acid dihalide is dissolved in water-immiscible organic hydrocarbons, such as pentane, hexane, benzene, or toluene; halohydrocarbons, such as trichloroethylene, chloroform, or trichlorobenzene; or ethers, such as diphenyl ether, and the like. The solution of one reactant is titrated against the other at relatively low temperatures, conveniently ranging from —15° C. to 100° C. with good agitation to permit contact between the reactants. The reaction is best run at atmospheric pressure, since no advantage is obtained in using higher or lower pressures. The insoluble polymer is isolated by filtration.

For solution polymerization a polar or non-polar solvent for both reactants is required. Suitable solvents include tertiary amines, such as pyridine, quinaldine, N,N-diethylaniline, N,N-dimethylaniline, and the like; sulfones, such as sulfolane; sulfoxides, such as dimethylsulfoxide; ethers, such as diphenyl ether; nitro aromatic hydrocarbons, such as nitrobenzene; or haloaromatic hydrocarbons, such as dichloro- or tri-chlorobenzene. These materials are generally not good solvents for polymers at room temperature; thus, the product recovery is facilitated by their use. The reactants need not be entirely soluble in the solvent medium, as the polmerization can be conducted in suspension with the use of the suitable suspending agent. The reaction is run at temperatures ranging between 100° C. and 350° C. under conditions to remove HX and water as fast as they are formed. Both water and HX (e.g. hydrogen halide or alcohol, if, respectively, the acid dihalide or diester is added as a reactant) tend to inhibit the reaction; hence their rapid removal is necessary in order to obtain polymers of the desired molecular weight. The reaction can be conducted under superatmospheric pressure, provided that means are available for venting HX and water. Superatmospheric pressures of up to 10 atmospheres are quite effective. Vacuum polymerization, using a moderate vacuum, also gives good results; a vacuum of less than 10 mm. of Hg is not required. The polymer is recovered either cold or hot filtration and is then rigorously washed and dried.

Melt polmerization is accomplished at temperatures ranging between about 180 and 450° C. with slow agitation. The HX and water are vented as formed and the product is isolated by cooling and washing.

In interfacial polymerization the mole ratio of reactants can vary considerably. Approximately stoichiometric amounts of reactants are needed in both solution and melt polymerization. It is particularly important in melt polymerization to have present the stoichiometric requirement of reactants.

All three types of polymerization must be conducted in a non-oxidizing atmosphere to prevent considerable cross-linking of the product. The polymerization can be suitably blanketed by an inert gas, such as nitrogen, oxygen, helium, argon, and the like. It is helpful to have 0.5–2% by weight of a suitable antioxidant, such as stannous chloride, present in the reaction mixture.

If desired, the polymers of the invention can be sulfide cross-linked by the presence of a controlled amount of oxygen, i.e. from 20 p.p.m. to 0.1% by weight based on the weight of the reactants, in the system during polymerization, or, alternatively, by the use of crude, sulfide-containing bis-(o-mercaptoarylamine) as a reactant.

The novel polymers of the invention are remarkably insoluble in practically all of the common solvents. The polymers give infrared absorption spectra characteristic of the benzothiazole structure, as will be seen in the examples that follow. By thermogravimetric analysis the polymers show remarkable thermal stability at temperatures up to about 500°–900° C. When measured for Vicat softening point, the products show less than 10 percent softening to 400° C.

Heat-resistant objects are made from the polymers by compression molding in a heated mold under pressures of, for example, 2–20 tons. After compression molding to the desired shape, the product can be heat cured at temperatures of approximately 400° C. to provide a high molecular weight, infusible shaped object.

Our invention is further illustrated by the following examples:

Example I

Benzidine dihydrochloride (25.7 g., 0.1 mole), sulfur monochloride (81.0 g., 0.6 mole), and acetic acid (100 ml.) were charged to a reactor. The yellow suspension was stirred and heated under a nitrogen atmosphere to reflux temperature. The suspension turned red at 96° C. with rapid gas evolution. Gas evolution virtually ceased after 11 hours at reflux temperature (113° C.). The cooled suspension was filtered and the resulting red-brown solid (62.4 g.) was washed portionwise with a total of 450 ml. of carbon disulfide. The insoluble red-brown solid (the thiathiazolium chloride) weighed 34.6 g. (92% of theory). Concentration of the carbon disulfide was gave 25.2 g. (200% of theory) of sulfur. The 34.6 g. of red-brown solid was stirred with 200 ml. of water for 0.5 hour. Neutralization to pH 7 required 0.246 mole of potassium hydroxide and stirring at 39° C. to 86° C. for ten hours gave a bright yellow suspension. Filtration and washing with water gave 23.0 g. (92% yield) of a yellow solid, the bis-(thiathiazolidone), which softens at 240° C., and melts at 255–260° C. This crude product can be used directly in the preparation of polymers of it can be treated as follows to make relatively pure 3,3'-dimercaptobenzidine for use according to the invention.

Thirty grams (0.08 mole) of the bis-(thiathiazolidone) prepared as described above was refluxed in 10% potassium hydroxide solution (225 ml.) for one hour. Additional solid potassium hydroxide and sodium hydrosulfite were added to the yellow suspension until a solution was realized. The dark red solution was filtered under nitrogen and the filtrate was acidified adding it to cold dilute acetic acid. The material which separated was redissolved in dilute potassium hydroxide and sodium hydrosulfite and reacidified under nitrogen. This treatment was repeated three times and the yellow solid (a total recovery of about 5 g.) which was isolated, had an infrared spectrum, consistent with that of the proposed structure of 3,3'-dimercaptobenzidine, exhibiting a strong mercapto absorption at 4.0$\mu$. A sample analyzed for free mercapto groups gave a value of 82%. The fresh product, by instantaneous M.P. determination on a Fisher-Johns block, sintered at 126° C., started melting at about 143° C., was ¼ melted (did not go further) at about 156° C. Crystallization studies showed that solution could be effected with pyridine, dimethylformamide and aniline, with aniline appearing to be the best solvent. A sample recrystallized from pyridine-ethanol mixture melting at 283–285° C. gave the following elemental analysis:

Calc'd. for $C_{12}H_{12}N_2S_2$: C, 58.03%; H, 4.87%; N, 11.28%; S, 25.82%; Total 100.00%. Found: C, 58.17%; H, 4.66%; N, 11.52%; S, 25.94%; Total 100.29%.

Example II

A mixture of N,N-diethylaniline (117.0 g.) and stannous chloride (3.4 g. of dihydrate) was heated under argon to 215° C., about 2 ml. of distillate being removed. After cooling, pure 3,3'-dimercaptobenzidine dihydrochloride (32.12 g., 0.10 mole) was added at 120–140° C., forming an orange solution. Upon cooling to 45° C., the mixture became rather gelatinous and terephthaloyl chloride (20.30 g., 0.10 mole) was added (being rinsed into the reactor with 10 ml. of diethylaniline). A slight exotherm, to 50° C., resulted with the formation of a red slurry. As the mixture was heated, a yellow slurry formed, and at 190° C., a distillate (apparently water) was observed and was withdrawn as formed. The reaction was carried on at 230–239° C. for 24.5 hours, a total distillate of 15 ml. being withdrawn having a lower layer of water of about 3 ml. The yellow powder was collected on a filter and was washed with two portions of boiling benzene (100 ml. each). In a series of washes, the product was stirred with two portions of 100 ml. each of the following solvents at reflux, each time being recovered on a filter: acid (5% HCl), water, base (5% $NH_4OH$), water, ethanol, pyridine, and ethanol. The yellow powder was then dried under vacuum (80° C. at 0.1 mm.) and found to weigh 29.8 g. (about 88% of theory). The infrared spectrum of this polymer was that of a polybenzothiazole, free of amide (no absorption at 3.05 and 6.1$\mu$). A sample of the product heated to 500° C. showed a marked decrease in infrared absorption at 6.0$\mu$, but no other change. This polymer had an inherent viscosity of 0.26. The product proved refractory toward combustion.

In parallel experiments, quinaldine proved a suitable replacement for diethylaniline, while tribenzylamine, although it yielded a polymer, underwent reaction and thus was less desirable.

Example III

A sample (3.2 g., 0.01 mole) of 3,3'-dimercaptobenzidine dihydrochloride was suspended in N,N'-diethylaniline (50 ml.) with stannous chloride (0.05 g.) added. The mixture was heated under an argon atmosphere to 100° C., forming an almost clear orange solution. Upon cooling, a red slurry formed with the addition of terephthaloyl chloride (2.02 g., 0.01 mole.) Upon heating at 200° C. for 14 hours, the red suspension became yellow. Upon cooling, a yellow-orange solid was collected on a filter, and was washed repeatedly with portions of benzene, dilute aqueous potassium hydroxide, ethanol and pyridine. The light orange solid (3.7 g. 108% of theory) was tested on a spatula held in a flame and found to be infusible, charring at red heat. The infrared absorption spectrum of this yellow-orange solid was consistent with the structure of poly-2-(1,4-phenylene)-2'-(6,6'-bibenzothiazole). A small sample of the yellow-orange powder was placed in an aluminum sandwich and heated in a press. After holding at 300° C. and 7,000 p.s.i.g. for 15 minutes, the sample was removed and cooled, being found to have completely fused to a yellow film. Small portions of the yellow-orange solid were tested with relatively large volumes of solvents and found to be practically insoluble in dimethyl sulfoxide, and 97% formic acid, but appreciably soluble in cold concentrated sulfuric acid. A 0.5% solution of the polymer in concentrated sulfuric acid had an inherent viscosity of 0.51 at 25° C. The polymer failed to dissolve sufficiently in 97% formic acid to give a 0.5% solution. This lack of solubility is a desirable feature in a structural polymer, since it indicates that the molded plastic will not be attacked by solvents. In contrast, the polybenzimidazoles are readily (at least 2%) soluble in formic acid and dimethyl sulfoxide. As further evidence of the greater resistance to solvent attack of benzothiazole-containing polymers over their benzimidazole analogs, the polymer having the "mer" I was far less soluble than the polymer of "mer" II.

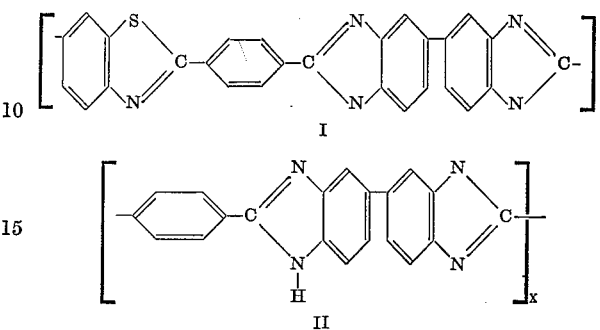

Example IV 3,3'-dimercaptobenzidine dihydrochloride (3.2 g., 0.010 mole), isophthaloyl chloride (2.02 g., 0.010 mole) and stannous chloride (0.05 g.) were suspended in diethylaniline (40 ml.). The mixture was heated in a nitrogen atmosphere to 205° C. during three hours and stirred at 205° C. for 15 hours. Tribenzylamine (20 g.) was added and the temperature increased to 275° C. during five hours. The resulting yellow suspension was poured into 200 ml. of benzene and filtered. The light yellow solid collected was washed successively with dilute hydrochloric acid, water, dilute sodium hydroxide, ethanol, pyridine and dimethylformamide. The dried yellow solid (3.2 g., 92% of theory) has an infrared absorption spectrum consistent with that expected of the proposed polymer. Weak bands at 3.05 and 6.05$\mu$ suggest the presence of water occluded in the polymer network and/or the presence of a small amount of amide. A small sample of the yellow powder was placed in an aluminum sandwich and subjected to 7500 p.s.i.g. at 300° C. for 15 minutes. The sample partially fused to a brittle yellow film. The infrared absorption spectrum of the film was identical to the spectrum of a sample before pressing except that the intensity of the bands at 3.05 and 6.05$\mu$ had decreased. The yellow solid formed a 1% solution in concentrated sulfuric acid. A 0.5% solution could not be realized from any other solvent tried (dimethyl sulfoxide, 97% formic acid, etc.).

Example V

A mixture of N,N-diethylaniline (33.1 g.) and diphenyl ether (92.1 g.), containing stannous chloride (0.6 g. of dihydrate) and diphenic acid (2.42 g., 0.010 mole), was heated under argon to 180° C., 12 ml. of distillate being taken off in removing traces of water. After cooling, dimercaptobenzidine·2HCl (95% purity) (3.25 g., 0.010 mole) was added and the mixture was heated and stirred under argon. Sufficient diethylaniline was distilled out to give a pot temperature of 245-250° C., the reaction being held at this temperature for 27 hours. After cooling and adding benzene (100 ml.), a brown flocculent material (0.2 g.) was collected on a filter. Addition of petroleum ether (100 ml.) to the clear yellow filtrate gave a yellow gum which was collected on a filter and washed successively with dilute acid, dilute base, water and ethanol, in the usual procedure. The yellow, powdery product, a mixture of dimers and trimers (2.4 g., about 60% of theory), was examined by infrared absorption. The spectrum showed weak absorptions at 3.1 and 6.0$\mu$, characteristic of a slight amide content. The absorptions found with other polybenzothiazoles at 7.1, 7.7 and 10.3$\mu$ were present. A sample of the yellow powder was heated on a melting point block, darkening slightly at 220° C. and sintering. At 240° C., a red-orange semi-liquid formed and at 257° C. droplets formed which appeared to darken slightly at the edges. The infrared spectrum of this melted sample was identical to the original. Solution of a portion of this polymer in concentrated sulfuric acid was readily obtained at about 2.5% concentration. A number average molecular weight range of about 900-1200 was determined in benzene by the vapor pressure osmometer method for the product poly-2-(2,2'-biphenylene)-2'-(6,6'-bibenzothiazole).

Example VI

A portion of quinaldine was treated with stannous chloride, then with caustic pellets and distilled under argon. The pale yellow fraction (200 g.) collected at 241–244° C. was transferred under argon to a reactor. Purified dimercaptobenzidine·2HCl (97% purity) (22.5 g., 0.07 mole) was added to give a yellow slurry at 60° C. With vigorous agitation and using a heating bath at 100° C., diphenic acid chloride (18.8 g., 0.07 mole) was added, under an argon atmosphere. The reaction mixture, which formed a deep red solution at about 200° C., was warmed to 245° C. within one hour. A condensate, primarily water, began forming at about 200° C. and was removed as formed (about 2 ml. of water collected). After a total heating time of 15.5 hours at 210–230° C. and 6.5 hours at 240–248° C., the dark brown liquid mixture was cooled. At 70° C., the dark brown mixture became thick and tarry; at 40° C. it was too thick to stir. Warming to 140° C. made it possible to pour the syrupy mixture into 2 liters of vigorously agitated ethanol. The brown product was collected on a filter and washed by stirring with hot portions (600 ml. each) of solvents (3 of 5% HCl, 2 of H₂O, 2 of 5% NH₄OH, 2 of H₂O, 3 of ethanol). The major portion of the product was recovered as a tan solid (20.5 g., 75.8% of theory) after solution in one liter of dimethylformamide and precipitation with 3 liters of ethanol. An isoluble fraction (3.4 g., 12.5% of theory) was separated from the dimethylformamide solution. Infrared absorption study of the two solids indicated similar structures, peaks at $3.0\mu$ for N—H), at $6\mu$ (for C=O of amide) and at $6.6\mu$ (aryl-N), indicating high amide content. The peak at $10.3\mu$ associated with benzothiazoles was also very strong.

Example VII

A mixture of dimercaptobenzidine·2HCl (4.82 g., 0.015 mole) and diphenyl oxy-bis(4-benzoate) (6.15 g., 0.015 mole) in N,N-diethylaniline (47.1 g.) with stannous chloride (2.7 g. of dihydrate) was stirred at 200–222° C. for 31 hours. About one-half of the diethylaniline was then distilled out during one hour to a final pot temperature of 237° C. The mixture was diluted with benzene (50 ml.) and filtered. After thorough washing with boiling acid (5% HCl) and base (5% NH₄OH) and with portions of boiling water, the light brown powder was washed repeatedly with boiling ethanol and vacuum dried. The product (3.4 g., 51% of theory) was examined by infrared absorption; it showed the peak at $10.3\mu$, typical of polymers with aryl links to the benzothiazole structure; the aryl ether absorption at $8.1\mu$ was as expected. A sample of powdered product was heated on a melting point block to 300° C., darkening at about 200° C. and appearing to soften slightly at 250° C. At 300° C., the material was hard black chunks. A 0.5% solution of the brown powder in concentrated sulfuric acid gave an inherent viscosity of 0.08 at 25° C. A portion of this product readily formed a 2% solution in sulfuric acid. Recovery of this material by dilution of the acid solution in ice-water resulted in a brown powder, which was partially soluble in ethanol, losing about 30% of its weight. This recovered polymer, poly-2-(4,4'-phenyleneoxyphenylene)-2'-(6,6'-bibenzothiazole), was only slight darkened by heating to 300° C. on a melting point block.

Example VIII

A mixture of diphenyl oxy-bis(4-benzoate) (9.33 g., 0.0228 mole) and 3,3'-dimercaptobenzidine (5.65 g., 0.0228 mole) was heated in a silicone oil bath, under a nitrogen atmosphere. The bath temperature was slowly raised during 5 hours to 300° C., condensate appearing at 213° C. At 300° C., the polymer still remained soft. The cooled dark green polymer removed from the reactor, contained chips of glass pulled away from the reactor's inner surface by the contracting melt. The glass-free portion of the polymer was ground to a fine light green powder and returned for further heating. The polymer was heated to 400° C. during 8 hours, under a vacuum from a water aspirator during the final hour of heating. The resulting dark brown polymer was boiled in pyridine, then ethanol, to give 9.89 g. (106% of theory) dried product. The infrared spectrum exhibited characteristic absorptions.

Calc'd for $(C_{24}H_{14}N_2OS_2)n$: C, 71.86%; H, 3.23%; N, 6.45%; S, 14.76%; total 96.30%. Found: C, 69.28%; H, 3.59%; N, 5.48%; S, 13.45%; total, 91.80%.

Example IX

The mercaptan-free polydisulfide of 3,3'-dimercaptobenzidine (9.0 g., 0.037 mole) was refluxed with 30% potassium hydroxide solution (60 ml.), sodium hydrosulfite (14.0 g.) and water (450 ml.) until a clear yellow solution was effected. The yellow solution was filtered under nitrogen and cooled to 5° C. A solution of isophthaloyl chloride (14.8 g., 0.073 mole) in benzene (400 ml.) was added dropwise during 2 hours at 5° C. under nitrogen. After complete addition, the resulting yellow emulsion was filtered and the resulting yellow solid washed with dilute sodium bicarbonate followed by water to yield 11.8 g. of a yellow solid. Isophthalic acid (5.3 g., 0.032 mole) was recovered from the filtrate and the wash. The infrared spectrum of a sample of the yellow solid exhibited absorptions characteristic of both aryl anilide (i.e. in complete cyclization) and benzothiazole (i.e. cyclization) as expected. Infrared study suggests that the thioester was not preferentially formed, but a mixture of amide and thioester was present in the uncyclized portions.

A 1.1 g. sample of the above yellow solid was heated during four hours in a nitrogen atmosphere to 380° C. A liquid (probably water) and a white sublimate (identified as isophthalic acid) was observed at 200° C. and 312° C., respectively. The cooled brown residue weighed 0.97 g. The infrared spectrum was that of a more fully cyclized polymer.

Example X

A mixture of dipotassium dimercaptobenzidine (5.6 g., 0.017 mole) and terephthaloyl chloride (3.4 g., 0.017 mole) was stirred in sulfolane (200 g.). A deep red solution with some light colored particles suspended, formed with a mild exotherm. After stirring for 16 hours at room temperature under argon, no change was detected. The mixture was heated at 140–190° C. for 16 hours and at 200–280° C. for 13 hours. The green powder obtained after the usual acid, base and ethanol washes amounted to 4.5 g. (76% of theory). Infrared absorption indicated that the product was a polybenzothiazole, with a band at $5.95\mu$ suggesting a high content of free carboxylic groups. A sample compression molded at 300° C. and 7,000 p.s.i.g. for 15 minutes formed a brittle, dark green disc. Use of a zinc chelate proved less efficacious, while cuprous benzidinedimercaptide was too unstable to give good polymers.

Example XI

An equimolar (0.01 mole) mixture of diphenyl isophthalate (3.18 g.) and 3,3'-dimercaptobenzidine was heated in an argon atmosphere to 400° C. for 33 hours. Condensate began to appear at 228° C. after heating for three hours. Continued heating to 248° C. during 16 hours resulted in a soft brown melt. The temperature was then raised to 290° C. during seven hours and the reactor placed under a vacuum of 15 mm. to facilitate phenol removal. The cooled dark green unwashed residual solid weighted 4.28 g. (theory is 3.42 g.). The green solid exhibited strong adhesion towards glass. This appeared to have occurred during the cooling period. The glass surface in contact with the polymeric green solid had been torn away showing remarkable adhesion. A sample of glass-free green solid (3.44 g.) was replaced in a reactor after being ground fine; it was held at 400° C. for seven hours. Washing the cooled brown solid first with boiling dimethylformamide, then ethanol, gave 2.75 g. of brown solid. This corresponds to a total weight of 3.43 g. (theory is 3.42 g.) disregarding mechanical losses. The infrared absorption spectrum indicated the presence of secondary amide; the elemental analysis of this insoluble, infusible, thermally-stable polymer indicated it was approxiamtely 50% cyclized and 50% crosslinked amide.

Example XII

An equimolar (0.01 mole) mixture of diphenyl pyridine-3,5-di-carboxylate (3.19 g.) and 3,3-dimercaptobenzidine (2.48 g.) was heated in an argon atmosphere. An orange melt formed at 159° C. and a white sublimate began to appear at 228° C. Condensate was observed at 248 C. and the brown melt began to bubble. The temperature was maintained at 250–253 C. for 17 hours and slowly raised to 300 C. during seven hours. The cooled, dark green solid was then ground fine and boiled in first pyridine, then ethanol, to yield 3.53 g. (theory is 3.43 g.) of green solid. The infrared spectrum exhibited absorptions at 3.0μ (weak, —N—H), 5.78μ (weak, —COOR), 6.0μ (weak —CONH— and/or —C=N—), 6.3μ (phenyl), 6.65μ (amide II band), 12.2μ (1,2,4-substitution) and other absorptions characteristic of the expected polymer. A sample of the green solid (2.4 g.) was replaced in the reactor for additional heating. The green solid turned brown upon heating at 400–410° C. during four hours. Washing this cooled solid with boiling pyridine and ethanol gave 1.94 g. of residue. The infrared absorption spectrum did not exhibit a band at 5.73μ characteristic of ester carbonyl. Absorptions were present which indicated the presence of some secondary amide, but was essentially benzothiazole polymer. It was thought that the solubility of the polymer would be enhanced by incorporating the pyridine unit in the polymer. This polymer did not exhibit increased solubility in sulfuric acid. A definite difference noted in employing diphenyl pyridine-3,5-dicarboxylate rather than diphenylisophthalate as a monomer was the adhesion to glass.

Example XIII

A mixture of 3,3′-dimercaptobenzidine (2.48 g., 0.01 mole) and isophthalic acid (1.66 g., 0.01 mole) was added to polyphosphoric acid (50 ml.) with stirring at 100° C. under a nitrogen atmosphere. The orange suspension quickly turned tan and then dark brown. The suspension was heated from 120° C. to 180° C. during five hours. The cooled dark suspension was poured into 400 ml. of water, filtered, and the filter cake washed with dilute sodium hydroxide solution followed by water. The dried filter cake (3.52 g.), washed first in boiling dimethylformamide, then water, then ethanol, yielded 3.17 g. (theory is 3.42 g.) of brown solid. The infrared absorption spectrum was essentially identical to previous polymers of this type but was better resolved, showing formation of both amide and benzothiazole units at relatively mild condensation conditions.

Example XIV

Perfluoroglutaryl chloride (2.76 g., 0.01 mole) and stannous chloride (0.05 g.) suspended in diethylaniline (20 ml.) were added in a nitrogen atmosphere to a stirred suspension of 3,3′-dimercaptobenzidine dihydrochloride (3.2 g.) in N,N-diethylaniline (20 ml.). The mixture turned green and an exotherm to 65° C. resulted. The green mixture formed a gelatinous suspension and turned a reddish orange after being stirred at 120° C. for 16 hours. Continued stirring and heating to 210° C. during five hours resulted in a clear dark red solution. The red solution was poured into benzene (200 ml.) and cooled to yield a dark red solid (0.2 g.). Concentration of the benzene solution and dilution of the residue with petroleum ether gave 4.0 g. of red gum. The infrared spectrum of the gum exhibited absorptions characteristic of the benzothiazole polymer. The red gum was dissolved in benzene (200 ml.) and the material fractionally precipitated by adding 100 ml. portions of heptane and cooling. Three fractions were collected; 0.05 g., 0.1 g. and 3.3 g., respectively. The 3.3 g. sample was dissolved in benzene (150 ml.) and filtered The filtrate was concentrated to yield 2.8 g. of a red glassy solid, M.P. 70–88° C.

Example XV

A mixture of N,N-diethylaniline (32.6 g.) and diphenyl ether (47.7 g.) was heated in the presence of stannous chloride (1.0 g.) to 230° C. After cooling, dimercaptobenzidine·2HCl (95% purity) (4.82 g., 0.015 mole) and maleic anhydride 1.47 g., 0.015 mole) were added. During heating and stirring, yellow gummy particles stuck to the walls of the reactor. At 232° C., this solid was less gummy and nearly white. Sufficient diethylaniline was distilled off to give a reaction temperature of 250° C. for two hours. After standing at 200° C. for 15 hours, the mixture was stirred at 250° C. for eight hours. The product, after the usual wash with boiling dilute acid, dilute base and ethanol was vacuum dried and found to be a red-brown powder (2.2 g., 50% of theory). Infrared absorption study showed negligible absorption for amide, but absorption at 10.3μ usually found was missing which may indicate that this absorption is due to a thiazole to aryl bond. Attempted solution of this polymer in concentrated sulfuric acid was attempted at about a 1.5% level. Approximately one-fourth of the material dissolved. After recovery of the acid-soluble fraction, infrared absorption showed that the absorptions were about the same except that the soluble fraction showed evidence of some amide content. Heating the original polymer and the acid-soluble fraction on a melting point block to 300° C. showed some darkening of the original powder, whereas the acid-soluble material darkened and partially fused beginning at about 200° C., becoming black chunks exhibiting slight compression at 300° C. when pressed with a spatula. The intense (black) color obtained a molding or heating this polymer is due to the formation of more nearly completely conjugated systems, e.g.

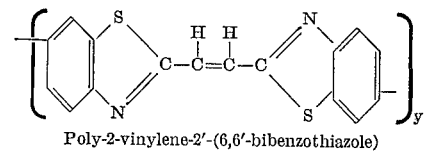

Poly-2-vinylene-2′-(6,6′-bibenzothiazole)

such as would be useful in semi-conducting plastics.

Example XVI

The sample of the dimercaptobenzidine intermediate, the bis-(thiathiazolidone) (10.15 g., 0.030 mole), was added to a mixture of potassium hydroxide (20 g.), stannous chloride (2.0 g. of dihydrate), tin (2.0 g.) and water (80 ml.). The mixture was filtered under argon, the clear orange filtrate passing into a reaction flask. Still under argon, stannous chloride (2.0 g. of dihydrate), tin (2.0 g.) and benzene (100 ml.) were added. The mixture was cooled to 5° C. and fumaryl chloride (4.59 g., 0.031 mole) was transferred to a filter under argon pressure. After washing and drying, two fractions were obtained, a brown powder (16.2 g.) insoluble in dilute acid or base and a light brown powder (3.6 g., 40% of theory) insoluble in dilute acid but soluble in dilute base (the theoretical yield of polymer is 8.8 g.). Infrared absorption of these two products gave spectra similar to the product from maleic anhydride and dimercaptobenzidine. However, the alkali-soluble material had very strong absorption in the 3 and 6μ region, indicating high amide content. When heated on a melting point block to 300° C., both fractions become black at about 200° C. and could be compressed slightly with a spatula at about 240° C. At 300° C., both samples were black, brittle chunks. The main fraction of solid was boiled with 4 N-hydrochloric acid for two hours. The residual brown powder amounted to 2.30 g. (26% of theory) and had an infrared absorption pattern the same as before.

We claim:

1. A polymer of the formula:

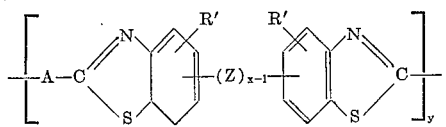

wherein R' is a member selected from the group consisting of hydrogen and methyl; Z is a member selected from the group consisting of O, S and $SO_2$; $x$ is an integer having a value of 1–2; A is a member selected from the group consisting of $C_nH_{2n}$ and $C_nH_{2n-2}$ wherein $n$ has a value of 2–10., $C_mF_{2m}$ wherein $m$ has a value of 2–10, phenylene, tolylene, phenyleneoxyphenylene, phenylenethiophenylene, phenylenesulfonylphenylene, alkylene-bis-phenylene, wherein the alkylene portion has from 1–10 carbon atoms, naphthylene, pyridyl, and benzothiazoylphenylene, and $y$ is a integer having a value of at least 2.

2. Poly-2-(1,4-phenylene)-2'-(6,6'-bibenzothiazole).
3. Poly-2-(1,3-phenylene)-2'-(6,6'-bibenzothiazole).
4. Poly-2(2,2'-biphenylylene)-2'-(6,6'-bibenzothiazole).
5. Poly-2-(4,4'-phenylenoxyphenylene-2'-(6,6'-bibenzothiazole).
6. Poly-2-vinylene-2'-(6,6'-bibenzothiazole).

7. A polymer having recurring units of the formula:

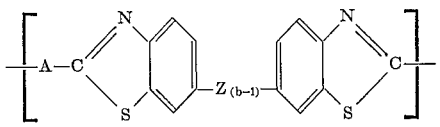

wherein Z is a member of the group consisting of O, S, and $SO_2$, $b$ is either 1 or 2 and A is a member of the group consisting of phenylene, tolylene, naphthalene, xenylene, phenyleneoxyphenylene, phenylenesulfonylphenylene, phenylenethiophenylene and pyridyl radicals.

8. A process for preparing the polymer of claim 7 which comprises reacting a bis-(o-aminobenzethiol) of the formula:

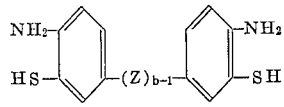

wherein Z and $b$ are as defined in claim 7 with a difunctional carboxylic acid halide of the formula

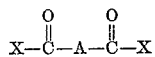

wherein X is a halide radical and A is as defined in claim 7.

References Cited

UNITED STATES PATENTS

| | | | |
|---|---|---|---|
| 2,904,537 | 9/1959 | Brinker | 260—78 |
| 3,047,543 | 7/1962 | Morton | 260—79 |
| 3,216,970 | 11/1965 | Conix | 260—47 |
| 3,230,196 | 1/1966 | Moyer | 260—47 |

OTHER REFERENCES

Brumfield et al.: ASD–TDR–62–372, U.S. Air Force, August 1962, pp. 61 and 65.

NASA, TN D–3148, December 1965, p. 17.

WILLIAM H. SHORT, *Primary Examiner.*

H. SCHAIN, *Assistant Examiner.*

U.S. Cl. X.R.

260—29.2, 30.8, 32.6, 33.4, 49, 78.4, 79, 695